United States Patent [19]
Kaneko

[11] Patent Number: 5,579,127
[45] Date of Patent: Nov. 26, 1996

[54] FACSIMILE APPARATUS

[75] Inventor: Yoji Kaneko, Yamato, Japan

[73] Assignee: Canon Kabushiki Kaisha, Tokyo, Japan

[21] Appl. No.: 561,236

[22] Filed: Nov. 21, 1995

Related U.S. Application Data

[63] Continuation of Ser. No. 430,299, Apr. 28, 1995, abandoned, which is a continuation of Ser. No. 116,544, Sep. 7, 1993, abandoned, which is a continuation of Ser. No. 578,441, Sep. 7, 1990, abandoned.

[30] Foreign Application Priority Data

Sep. 8, 1989 [JP] Japan ................................. 1-234219

[51] Int. Cl.$^6$ ............................. H04N 1/00; H04M 11/00
[52] U.S. Cl. ........................... 358/434; 358/438; 358/442; 379/100
[58] Field of Search .................................. 358/400, 404, 358/434, 438, 444, 442; 348/14, 15, 16, 17; 379/94, 96, 98, 100; H04N 1/00

[56] References Cited

U.S. PATENT DOCUMENTS

| | | | |
|---|---|---|---|
| 3,873,771 | 3/1975 | Kleinerman et al. | 379/53 |
| 4,849,811 | 7/1989 | Kleinerman | 379/53 |
| 4,953,159 | 8/1990 | Hayden et al. | 379/53 |
| 4,974,097 | 11/1991 | Kaneko et al. | 358/400 |
| 4,994,926 | 2/1991 | Gordon et al. | 358/400 |
| 4,995,073 | 2/1991 | Okata et al. | 370/110.1 |
| 5,018,186 | 5/1991 | Kimura et al. | 379/53 |
| 5,042,028 | 8/1991 | Ogawa | 370/58.2 |
| 5,046,079 | 9/1991 | Hashimoto | 379/53 |
| 5,056,136 | 10/1991 | Smith | 379/53 |
| 5,081,539 | 1/1992 | Kaneko | 358/437 |

OTHER PUBLICATIONS

Hawkins, William J "Video Phones" Mar. 1988 p.62 Popular Science vol. 232.

Primary Examiner—Kim Vu
Assistant Examiner—Kimberly A. Williams
Attorney, Agent, or Firm—Fitzpatrick, Cella, Harper & Scinto

[57] ABSTRACT

A facsimile apparatus which is connected to the ISDN having a plurality of information channels comprises: a receiving circuit to receive image data and voice data which were sent from a partner apparatus; memories for storing the image data and the voice data which were received by the receiving circuit; an instructing circuit to instruct the output of the image data stored in the memory; and an output device for outputting the image data and the voice data stored in the memories in accordance with the instruction of the instructing circuit. The receiving circuit can simultaneously receive both of the image and voice data as a pair by using the two information channels of the ISDN.

13 Claims, 5 Drawing Sheets

FACSIMILE APPARATUS

This application is a continuation, of application Ser. No. 08/430,299 filed Apr. 28, 1995, now abandoned, which is a continuation of application Ser. No. 08/116,544 filed Sep. 7, 1993, abandoned, which is a continuation of application Ser. No. 07/578,441 filed Sep. 7, 1990, abandoned.

BACKGROUND OF THE INVENTION

1. Field of the Invention

The present invention relates to a facsimile apparatus and, more particularly, to a facsimile apparatus which is connected to the ISDN having a plurality of information channels.

2. Related Background Art

In the case of transmitting and receiving an original between facsimile apparatuses, there are many cases where the user wants to communicate by voice, for instance, in order to discuss an important matter or the like regarding the original or the like.

Hitherto, in such a case, the following method is used. That is, if a telephone is attached to the apparatus, the user on the transmission side previously makes a reservation using the telephone upon facsimile communication, and after completion of the communication, the apparatus is switched to the telephone on the basis of the reservation. Therefore, the transmission side and the reception side can communicate and the user now executes a desired speech communication.

On the other hand, in the facsimile apparatus having no telephone, the user executes a speech communication by separately using another telephone.

However, in such conventional apparatuses, there are the following difficulties and, particularly, a large problem occurs when considering the case of the reception in the confidential communication (personal communication) mode.

That is, in conventional methods, a telephone must be used. Moreover, since a speech communication is executed by using the telephone, at the time of a confidential output of a facsimile image which was confidentially received, in order to also obtain a voice message from the partner, the voice message cannot be obtained upon confidential document output if the apparatus on the reception side is not set to the telephone of the reception side user and, further, any special response is not made for that purpose.

That is, in the case of the confidential reception or the like in which data is once stored in a memory and, thereafter, the data is output by an instruction of the operator, a voice message must be recorded on a tape.

For instance, in the case of the facsimile apparatus to which a telephone is attached, the apparatus is requested such that the telephone has not only a simple communicating function but also another mechanism such as an automatic answering and recording telephone set. Moreover, the voice from the partner user must be recorded to, e.g., a tape in a form as mentioned above separately and independently from the facsimile image information and the voice must be stored as a voice message or the like.

According to a method whereby such an automatic answering and recording telephone set mechanism is provided for the facsimile apparatus in order to obtain a voice message upon confidential output, there are drawbacks such that the costs of the apparatus having the above mechanism increase, its control also becomes complicated, and the like. Therefore, in the conventional apparatus, it is difficult to almost simultaneously obtain the voice message upon confidential output.

An apparatus which can communicate both image and voice data during one communication has been proposed in U.S. patent application Ser. No. 403,842, now U.S. Pat. No. 4,932,048. Further, apparatuses which are connected to the ISDN and can communicate both of an image and voice data have been proposed in U.S. patent application Ser. Nos. 258,768, now U.S. Pat. No. 4,995,073, 436,254, now U.S. Pat. No. 5,101,427 and 543,416, now U.S. Pat. No. 5,280,520. However, according to the above apparatuses, both image and voice data cannot be simultaneously communicated or output.

SUMMARY OF THE INVENTION

The present invention is made to solve the drawbacks of the conventional techniques mentioned above and it is an object of the invention to provide a facsimile apparatus which can also output a voice message simultaneously with the output of image data stored in a memory.

Another object of the invention is to provide a facsimile apparatus in which image data and a voice message which were sent from a partner apparatus are stored as a pair, so that the voice message can be output simultaneously with the output of the image data.

Still another object of the invention is to provide a facsimile apparatus which can transmit and receive a voice message together with image data by a simple construction without using a complicated construction such that an automatic answering and recording telephone set mechanism is provided.

Further another object of the invention is to provide a facsimile apparatus which can simultaneously transmit both image data and a voice message by using a plurality of information channels of the ISDN.

Further another object of the invention is to provide a facsimile apparatus in which image data and voice data which were sent from a partner apparatus thorugh the ISDN are stored into a memory and when the image data is output from the memory by an operation of the operator, the voice data can be simultaneously output from the memory.

The above and other objects and features of the present invention will become apparent from the following detailed description and the appended claims with reference to the accompanying drawings.

DETAILED DESCRIPTION OF PREFERRED EMBODIMENTS

An embodiment of the present invention will be described hereinbelow with reference to the drawings.

Figure 1:
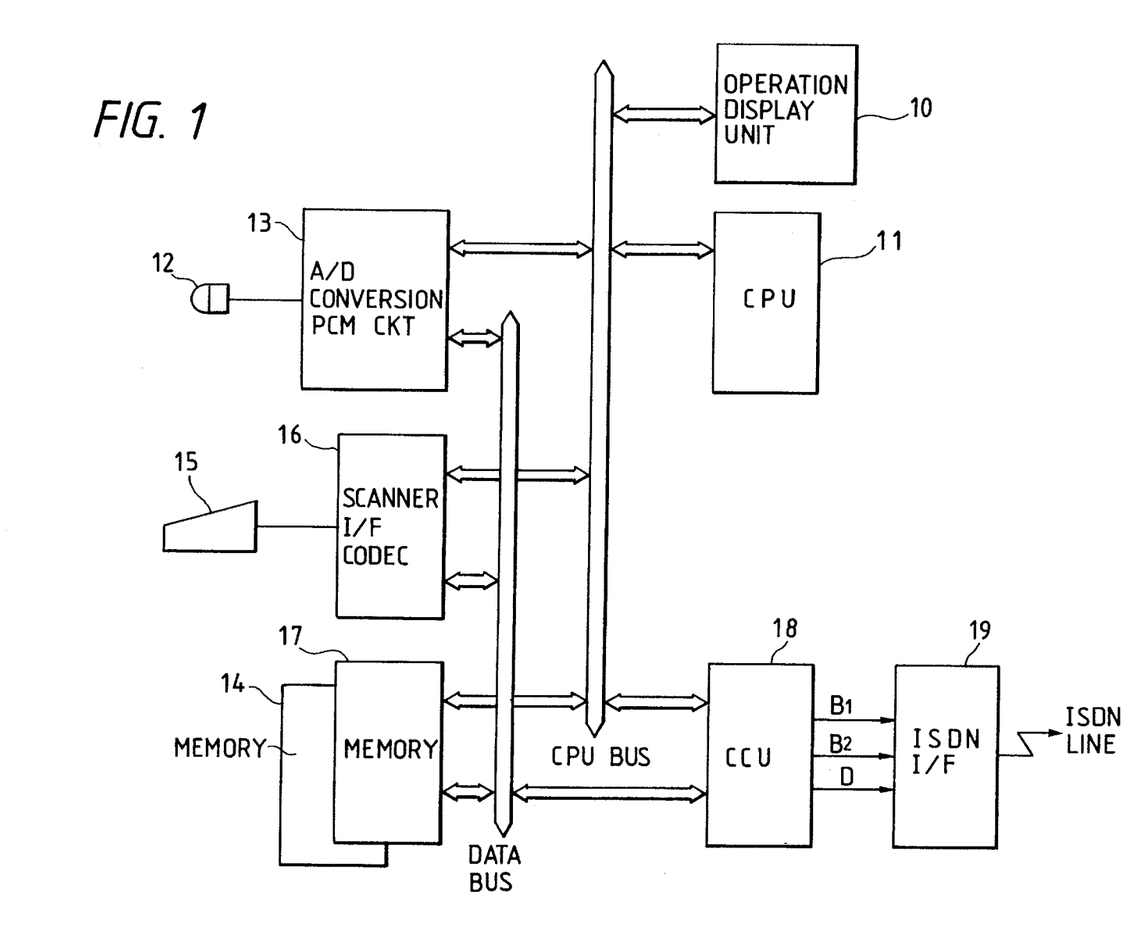
FIG. 1 is a diagram showing an example of a construction of a facsimile apparatus on the transmission side.

FIG. 1 is a block diagram showing an example of a facsimile apparatus on the transmission side which can transmit communication data to a facsimile apparatus according to an embodiment of the present invention shown in FIG. 2, which will be explained hereinlater.

In FIG. 1, reference numeral 11 denotes a CPU and 18 indicates a CCU as a communication control unit, respectively. The CPU 11 controls the whole system. The CCU 18 controls the communication.

The apparatus is a facsimile which is connected as an ISDN terminal to the ISDN network. In the example shown in the diagram, the apparatus further comprises: an operation display unit 10; a scanner 15; a CODEC 16 connected to the scanner 15; an accumulation memory 17 for image information; and an ISDN interface (I/F) 19. The apparatus also has: a voice inputting microphone 12; a PCM circuit 13 for A/D conversion connected to the microphone 12; and a memory 14 to store digital voices.

The CPU 11 is connected to the CPU bus. The CCU 18, operation display unit 10, PCM circuit 13, CODEC 16, and memories 14 and 17 are connected to the CPU bus. The CODEC 16, PCM circuit 13, and memories 14 and 17 are further connected to a data bus, respectively.

As mentioned above, the apparatus comprises: the operation display unit 10; CPU 11 to control the apparatus; scanner 15 to read an image of an original or the like; CODEC 16 for adjusting an image signal and converting into facsimile codes such as MH, MR, MMR, or the like; memory 17 to store the facsimile codes; CCU 18 to control a communication; and ISDN I/F circuit 19 which is an interface (I/F) of the CCU 18 with the $B_1$, $B_2$, and D channels and connects with an ISDN line. The apparatus also has: the microphone 12 for voice input; PCM circuit 13 for converting the voice signal into the digital signal which was encoded from an analog signal; and memory 14 for storing the (PCM) digital voices.

The scanner 15 reads a transmission image from the set original in the transmission mode and outputs original image data. The image information is transmitted to the ISDN line through the CODEC 16, memory 17, and further, CCU 18 for execuitng a D channel procedure and a B channel procedure by communication protocol which is specified by the ISDN.

That is, the CCU 18 controls the facsimile communication and is connected to an ISDN subscriber's line via the ISDN I/F 19. Due to this, upon transmission, the CCU 18 controls the B and D channels in accordance with the protocol in the ISDN.

The B channel is a representative information channel in the ISDN and has a data transmission rate of 64 kb/sec. In the case of a fundamental interface of 2B+D comprising two B channels and one D channel in the ISDN, there are two information channels of such a capacity and both the voice information and the facsimile image are simultaneously transmitted by using the two B channels.

That is, in the facsimile connected to the ISDN, there are provided a voice inputting apparatus comprising the microphone 12, PCM circuit 13 for encoding an analog voice into digital codes, and memory 14 for storing the digital codes, wherein an image is stored as facsimile codes into the memory 17, the respective digital codes are simultaneously transmitted by the $B_1$ and $B_2$ channels, and both the voice message and the image are simultaneously transmitted.

The outlines of the method of, operation, and the like of the apparatus will now be described as follows.

First, the operator sets an original on the scanner 15. When it is desired to also transmit a voice message to a partner, the operator speaks into the microphone 12. In this case, the voice is digitally encoded (PCM) by the PCM circuit 13 and stored into the memory 14.

Then, the telephone number of the partner side is input at the operation display unit 10 and the communication is started. In association with the start of the communication, the image signal which was read out by the scanner 15 is converted into the facsimile codes such as MMR by the CODEC 16 and stored into the memory 17.

As mentioned above, the CCU 18 executes the D and B channel procedures by the communication protocol of the ISDN. Practically speaking, the CCU 18 first executes a connecting procedure by a D channel signal. At this time, if both the voice and the image are to be simultaneously transmitted, a message indicative of such a request is informed to the partner apparatus by a pre-procedure. Further, the data as $B_1$ and $B_2$ signals are read out of the memories 14 and 17 and the voice PCM and facsimile codes are sent to the ISDN I/F 19 by using the $B_1$ and $B_2$ channels.

The ISDN I/F 19 reconstructs the signals of the $B_1$ and $B_2$ channels in accordance with the rule of the ISDN line and transmits to the ISDN line.

In the case of executing the confidential communication, a message indicating that the confidential communication is performed is further informed to the partner apparatus by the pre-procedure.

In a manner similar to the above, the communication data comprising the image data and the voice data is transmitted.

In the embodiment, an example in which the voice message is input from the microphone has been described. However, a plurality of voice messages can be previously stored into a memory and one of the messages may be also selected.

Figure 2:
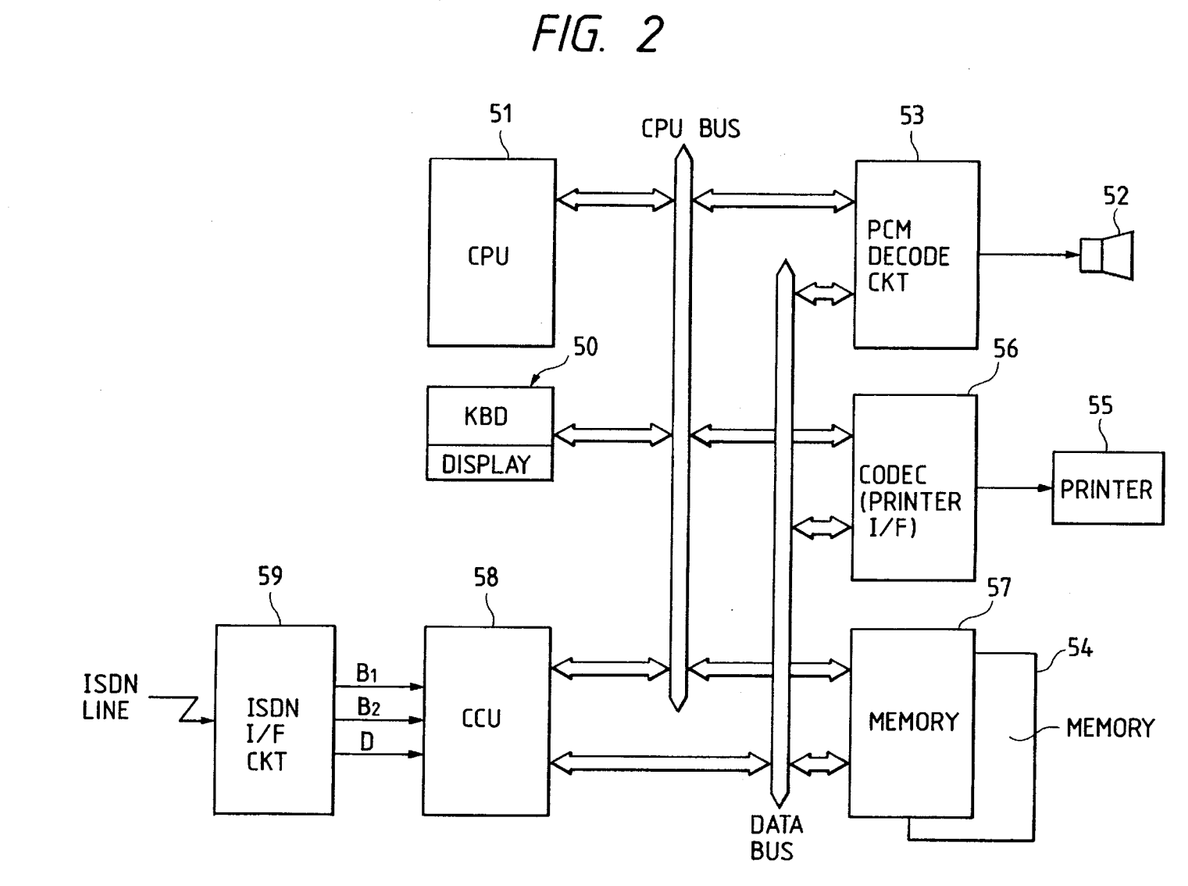
FIG. 2 is a block diagram showing an example of a construction of a facsimile apparatus according to an embodiment of the invention.

FIG. 2 is a block diagram of a facsimile apparatus according to an embodiment of the invention to receive the transmission signal which is transmitted as mentioned above.

The facsimile apparatus of the embodiment has: a voice outputting apparatus; a PCM CODEC circuit to decode the received digital voice (PCM codes) into the analog signal; and memories for storing the digital codes of the $B_1$ and $B_2$ channels, wherein the communication data (image and voice) which was confidentially received is temporarily stored and when the confidential outputting mode is selected by a command of the operator, the image and voice data which were stored as a pair in the memory are simultaneously output.

That is, in the embodiment, the facsimile apparatus comprises: a CPU 51 to control the whole apparatus; an ISDN I/F circuit 59 for executing a physical/electrical interface (I/F) with the ISDN line and decomposing the signal channels $B_1$, $B_2$, and D of the ISDN; and a CCU 58 for receiving and analyzing the respective signal channels from the ISDN I/F circuit 59 and controlling the communication. In a manner similar to the transmission side facsimile, the CCU 58 controls the communication, while the CPU 51 integratedly controls the whole facsimile apparatus on the basis of the stored programs.

The CCU 58 is connected to the CPU 51 through a CPU bus together with the operation display unit 50 comprising a keyboard which is operated by the operator and a display section such as a liquid crystal display (LCD) or the like and the other circuit sections.

As will be explained hereinafter, in the case where the communication from the partner facsimile is the confidential communication, the display section of the operation display unit 50 displays a message indicative of the presence of a confidential document when the communication data which had confidentially been received was temporarily stored.

When the confidential document is output on the basis of such a display, the keyboard is used for the confidential output operation by the operator.

Further, the apparatus of the embodiment has two memories serving as temporary storage means of the communication data including voice information from the partner upon confidential reception. That is, the apparatus has: a voice memory 54 to store the digital PCM codes from the CCU 58 of the amount corresponding to at least one communication; and an image memory 57 to store the facsimile image (MH, MR, MMR) data from the CCU 58 of the amount of at least one communication. The memory 54 is connected via a data bus. The PCM codes from the memory 54 are converted into the analog signal by a PCM decode circuit 53. A CODEC printer I/F 56 is connected to the data bus and decodes the facsimile image (MMR) from the memory 57 and transmits as an image signal to a printer, which will be explained hereinlater. Further, the facsimile apparatus has a speaker 52 to change the analog signal from the PCM decode circuit 53 into the audible sound and a printer 55 to output the image signal from the CODEC 56 to paper. Both of the facsimile image and the voice message which were received from the two B channels of the ISDN are simultaneously output. On the other hand, upon output of the confidential document (image) as well, the voice data and the image data are simultaneously output from the memories 54 and 57.

Figures 3, 3A:
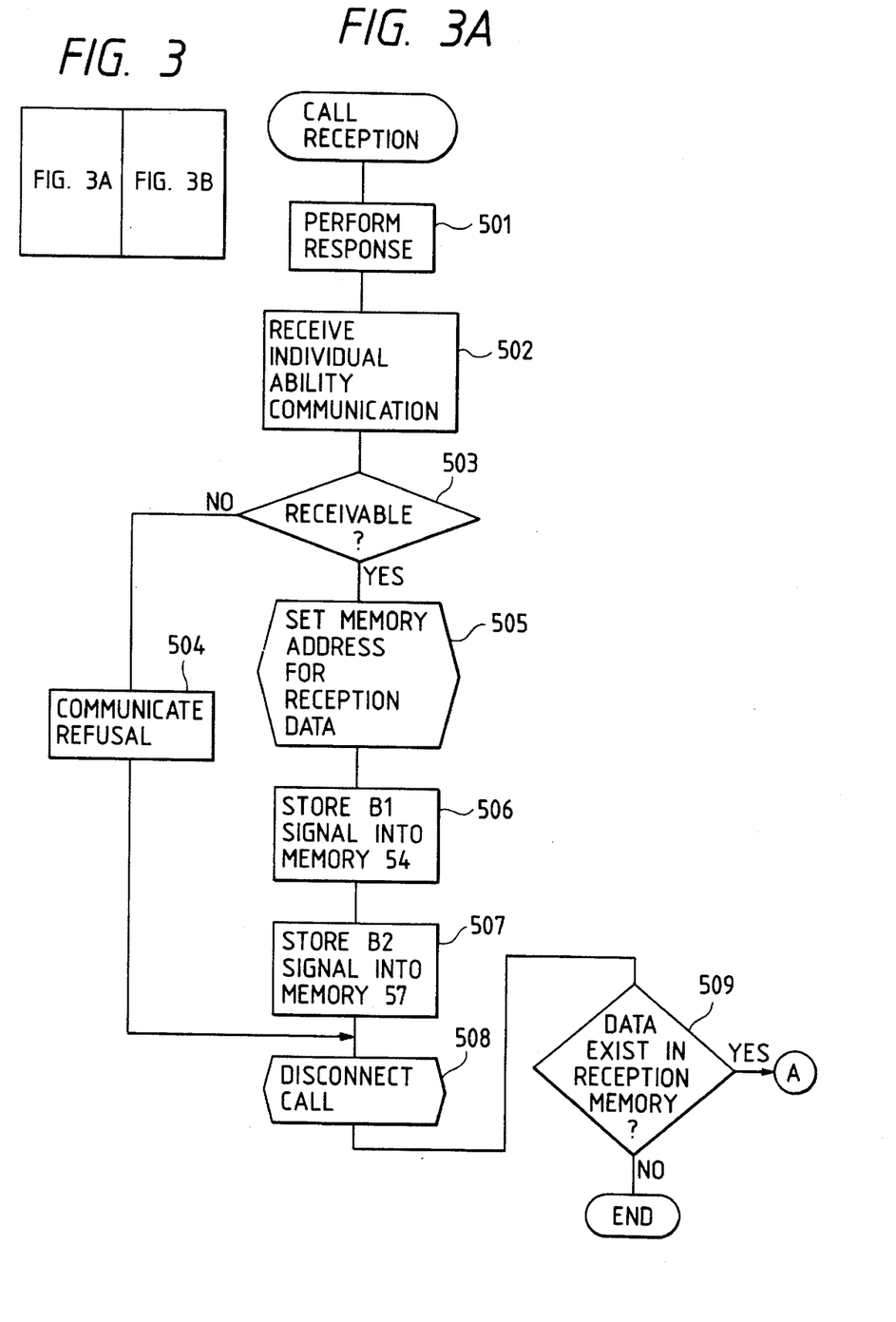
FIG. 3 is a flowchart showing an example of the contents of processes in the reception mode.
Figure 3B:
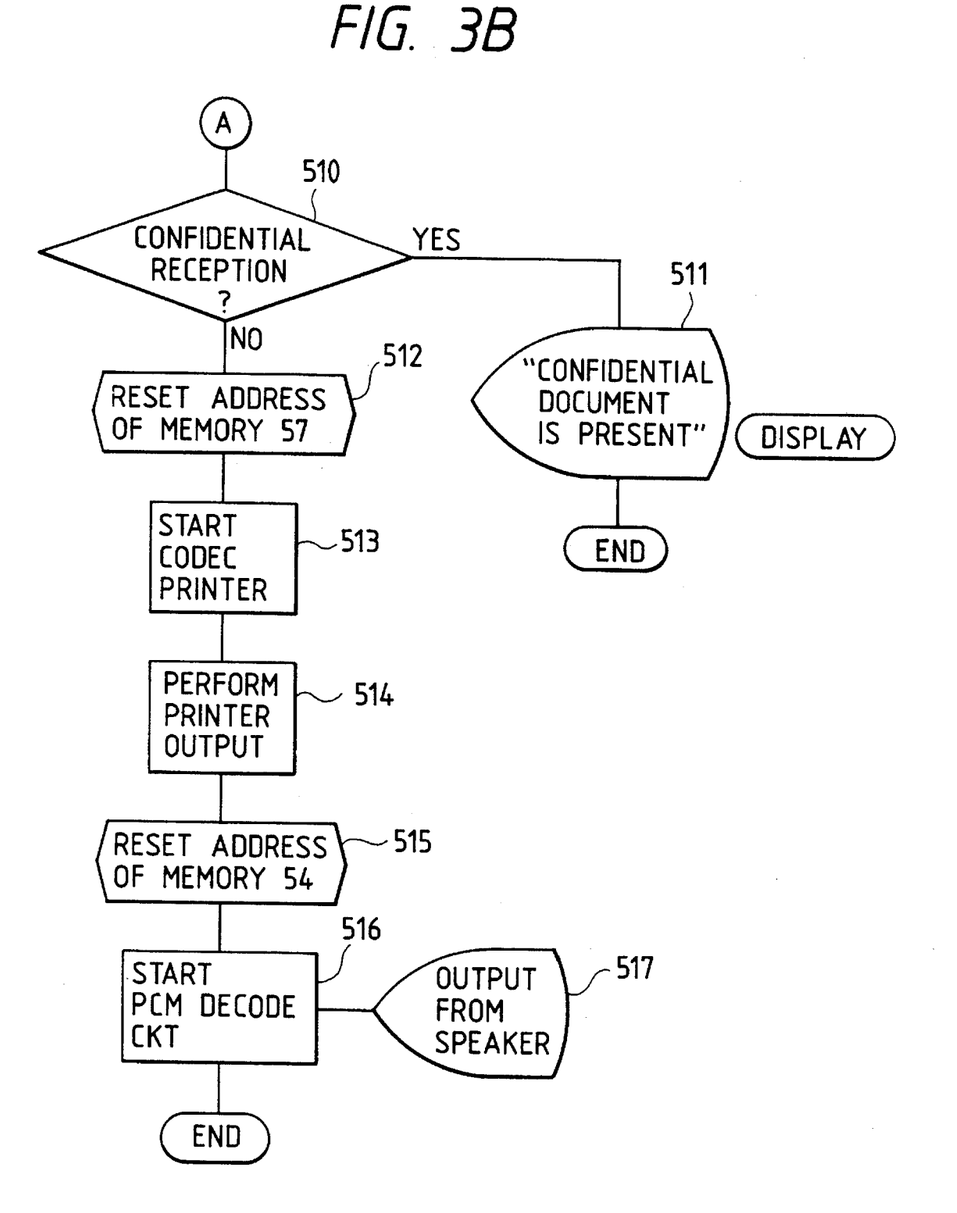
Figure 4:
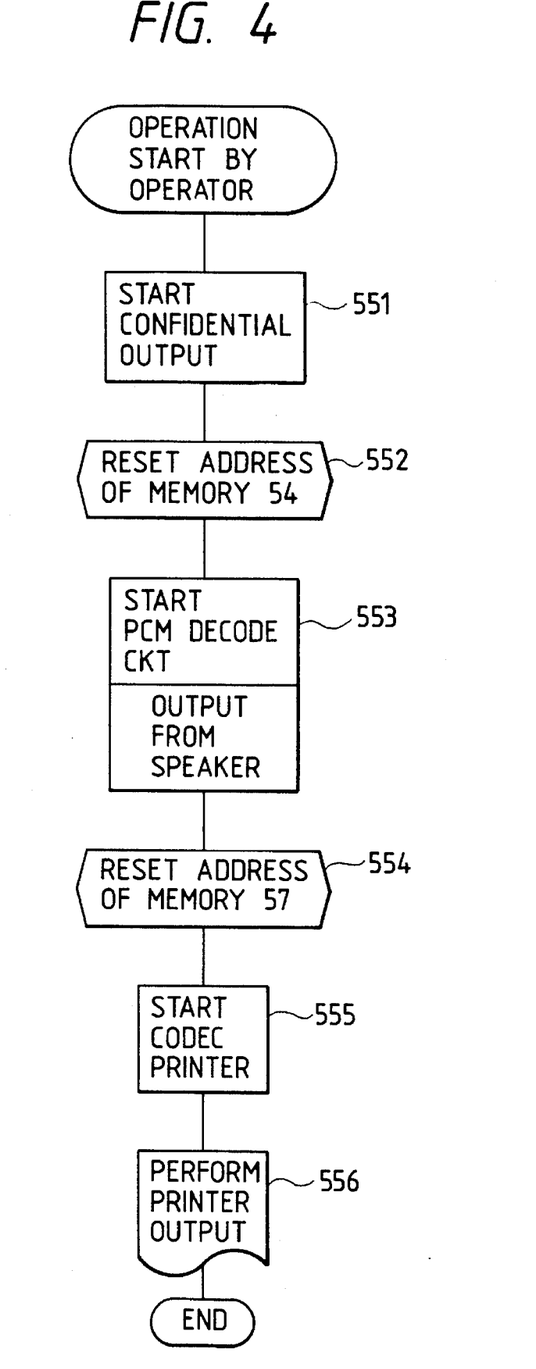
FIG. 4 is a flowchart showing an example of a confidential output process.

Therefore, control programs of the CPU 51, programs as shown in flowcharts in FIGS. 3 and 4 as examples have previously been stored in a program storing section. The CPU 51 executes the processes in accordance with the programs. In the case of the confidential communication, on the basis of the communication data comprising the images and voices which were received and temporarily stored, both of the facsimile image and the voice message are simultaneously output upon confidential output.

A practical process example in the case of the simultaneous output will be further described also with reference to FIGS. 3 and 4.

The simultaneous outputting process of the facsimile image and the voice message can be executed in the following manner. Explanation will now be made hereinbelow with respect to an example of the case where PCM codes as a voice are multiplexed to, for instance, the $B_1$ channel signal of the ISDN and a facsimile image is multiplexed to the $B_2$ channel signal and the transmission is executed.

In the construction on the reception side shown in FIG. 2, when a terminating call is received from the ISDN line, the ISDN I/F 59 informs the D channel signal control to the CCU 58 and the fact that the terminating call was received is reported from the CCU 58 to the CPU 51.

That is, in FIG. 3, a response process (step 501) and an individual ability communication receiving process (step 502) are first executed. In the above steps, a check is made to see if the data which is transmitted is both of or either one of the voice and the image on the basis of a procedure signal from the partner apparatus. A check is also made to see if the receiving mode is the confidential receiving mode or not.

On the basis of the result of the discrimination, if the data is either one of the voice and the image, each receiving process is executed. FIG. 3 shows the case where both of the voice and image data are sent.

Then, a check is made to see if the data is receivable or not (step 503). If the answer is NO in step 503, refusal is informed to the partner apparatus (step 504) and a call disconnecting process is executed in step 508. On the contrary, if YES in step 503, in the example of the program, a memory address for reception data is set (step 505) and accumulating processes into the memories are executed (steps 506, 507). Practically speaking, if the data is receivable, the B channel information signal is first sent from the ISDN I/F 59 to the CCU 58 by the subsequent facsimile procedure.

At this time, since the information regarding which one of the channels $B_1$ and $B_2$ relates to the PCM codes or facsimile codes has been reported to the CCU 58 on the procedure, for instance, if the $B_1$ channel relates to the voice PCM codes as in the embodiment, they are stored in the memory 54; on the other hand, if the $B_2$ channel relates to the facsimile codes, they are stored into the memory 57 (steps 506, 507). As mentioned above, the B channel information signals are stored into the memories 54 and 57, respectively. At this time, in the CPU 51, the fact that those data are the pair data and the storage start addresses in the memories are set.

After completion of the reception of the image and voice data, the processing routine advances from step 507 to step 508 and the call is disconnected.

In the next step 509, a check is made to see if data exists in the reception memory or not. If NO, the processing routine is finished. If YES, that is, if the data has been stored by the reception, the processes in step 510 and subsequent steps are executed.

When the processing routine advances from step 509 to step 510, a check is made to see if the receiving mode is the confidential receiving mode or not. Such a discriminating process is executed on the basis of the information from the partner which was received in step 502. If YES in step 510, a message indicating that "CONFIDENTIAL DOCUMENT IS PRESENT" to inform that the confidential reception was performed is displayed in the display section of the operation display unit 50 (step 511).

After the B channel information signals were stored into the memories 54 and 57, respectively, if the communication content relates to the confidential reception, the CPU 51 is set into the standby mode in a state in which the data was stored in the memories. At this time, the presence of the confidential document is displayed by the display section.

On the other hand, if NO in step 510, this means that the communication content does not relate to the confidential document. Therefore, at this time, the processes in step 512 and subsequent steps are executed in order to output the received facsimile image and to also simultaneously output the voice message if it exists.

That is, first, in step 512, the address in the memory 57 is reset. This address has been set in step 505. Then, the CPU 51 makes the CODEC printer I/F 56 operative (step 513). The facsimile codes (MMR) from the memory 57 are decoded by the CODEC and sent as an image signal to the printer 55 and are output to the paper (step 514). The CPU 51 recognizes that the image and voice data were transmitted as a pair on the basis of the procedure of the partner apparatus which is received in step 502. Therefore, the address in the memory 54 is reset in step 515 during the printing operation of the image. The address has been set in step 505. The CPU 51 then makes the PCM decode circuit 53 operative (step 516) and D/A converts the PCM codes from the memory 54 and outputs as a voice from the speaker 52 (step 517).

In the ordinary reception as well, as mentioned above, since both data can be concurrently extracted from the memories 54 and 57, the voice message can be output simultaneously with the output of the reception image.

As mentioned above, the voice message can be simultaneously output during the reception of the facsimile image, so that there is no need to attach other telephones set to the facsimile apparatuses (on both of the transmission and reception sides). Thus, the unnecessary increase in costs can be prevented.

Further, in the case of the confidential document as mentioned above as well, if the voice data has been stored in the memory 54, both of the voice and image data can be simultaneously taken out of the memories 54 and 57, so that the voice message can be also output when the confidential document (image) is output.

The above processes can be executed as shown in FIG. 4.

That is, in FIG. 4, first, the confidential output is started in step 551. That is, upon confidential reception, a message indicative of the presence of the confidential reception has been displayed by the display section of the operation display unit 50 in step 511 in FIG. 3. Therefore, if the operator desires to output the confidential document, the operator inputs the document number to be output, personal identification number, and the like from the keyboard by looking at the displayed message so as to output the confidential document. In the next steps 552 and 553, upon reception of the confidential document, the CPU 51 makes the memory 54 and the PCM decode circuit 53 operative and outputs as a voice from the speaker 52. Such voice data has been stored in the memory 54 as a pair together with the document number which was input by the operator.

As mentioned above, the PCM codes (voice) in the memory 54 are converted into the analog signal by the PCM decode circuit 53 and can be regenerated as an audible sound from the speaker 52.

Further, in the subsequent steps 554 to 556, an outputting process of the facsimile image is executed by the printer 55 in a manner similar to the above and the processing routine is finished. That is, the memory 57 and the CODEC 56 are made operative, the facsimile codes (image) of the input document number in the memory 57 are converted into the video signal by the CODEC 56, and the video signal is sent to the printer 55 via the printer I/F and output to the print paper.

As mentioned above, even in the case of the confidential communication, since both of the voice and image data can be simultaneously extracted from the memories 54 and 57, the voice message can be heard upon confidential document output. Therefore, the voice message from the partner can be also output upon confidential document output and such an operation can be easily performed. There is no need to use any special device such as an automatic answering and recording telephone set mechanism as an attached telephone.

The present invention is not limited to the above embodiment.

For instance, in the embodiment, control is made in a manner such that in the case where the communication data (image, voice) which was confidentially received is temporarily stored and, upon confidential output, both of the facsimile image and the voice message are simultaneously output, the voice message is output prior to outputting the confidential document (image) as shown in FIG. 4. However, such a control can be also performed by the processes as shown in steps 512 to 517 in FIG. 3. Accordingly, the control may be also executed in accordance with the opposite order.

On the other hand, although the facsimile image is output from the printer 55 to the paper, the voice message does not remain as a record after it was once generated. Therefore, it is also possible to construct a program in a manner such that the voice data can be again extracted from the memory 54 by the operation so that the operator can again access the voice data.

Further, the function on the transmission side shown in FIG. 1 and the function on the reception side shown in FIG. 2 can be also provided for one facsimile.

According to the invention, the voice message can be also output using the ISDN upon confidential output in the case of the confidential communication in the facsimile communication. Therefore, there is no need to additionally connect a telephone or an automatic answering and recording telephone set mechanism to the facsimile and an unnecessary increase in costs can be prevented.

That is, both of the image data and the voice data are stored as digital data into the memories and the voice data is converted into the analog data and output when the image data is output. Thus, there is no need to use a cassette tape or the like for recording voice data as in the conventional apparatus and the costs can be reduced.

Further, the image data and the voice data can be simultaneously communicated by using two information channels $B_1$ and $B_2$ of the ISDN. The communicating time can be reduced.

Although the present invention has been described above with respect to the preferred embodiment, the invention is not limited to the foregoing embodiment but many modifications and variations are possible within the spirit and scope of the appended claims of the invention.

What is claimed is:

1. A facsimile apparatus comprising:

reception means for simultaneously receiving encoded digital image data and encoded digital voice data which were sent from a partner apparatus;

memory means for simultaneously storing the digital image data and the digital voice data which were received by said reception means;

instruction means for instructing the digital image data and the digital voice data stored in said memory means to be output;

decode means for decoding the digital image data and the digital voice data both stored in said memory means, in accordance with an instruction from said instruction means;

output means for outputting a voice signal on the basis of the decoded voice data and outputting visible image data on the basis of the decoded image data, wherein said output means simultaneously outputs the image data and the voice data; and judgment means for judging, based on a procedure signal sent from the partner apparatus before the data reception, whether the data sent from the partner apparatus are both the voice data and the image data or is either one of the voice and image data, wherein said reception means, said memory means and said output means execute the simultaneous processing of the voice data and the image data, when said judgment means judges that the data sent from the partner apparatus are both the voice data and the image data.

2. An apparatus according to claim 1, wherein said facsimile apparatus is connected to an ISDN having a plurality of information channels.

3. An apparatus according to claim 2, wherein said reception means simultaneously receives the digital image data and the digital voice data by using two of said plurality of information channels of the ISDN.

4. An apparatus according to claim 1, wherein said memory means stores the digital image data and the digital voice data as a pair.

5. An apparatus according to claim 1, wherein said instruction means instructs confidential image data stored in said memory means to be output.

6. An apparatus according to claim 1, further comprising display means for displaying that the image data has been stored in said memory means.

7. An apparatus according to claim 1, wherein the voice data to be received has been PCM encoded and said output means reads out the PCM encoded data from said memory means and converts the PCM encoded data into an analog signal and outputs the data as a voice.

8. A facsimile apparatus which is connected to an ISDN, comprising:

reception means for simultaneously receiving voice information and image information which were digitally encoded from a plurality of channels of the ISDN;

memory means for simultaneously storing the digitally-encoded voice information and the digitally-encoded image information both received by said reception means;

conversion means for converting the digitally-encoded voice information which was stored by said memory means into an analog signal;

control means for simultaneously executing a recording output of the image information which was received by said reception means and a voice output based on the analog signal which was converted by said conversion means; and judgment means for judging, based on a procedure signal from a partner apparatus before the data reception, whether the information sent from the partner apparatus are both the voice information and the image information or is either one of the voice and image information, wherein said reception means, said memory means and said control means execute the simultaneous processing of the voice information and the image information, when said judgment means judges that the information sent from the partner apparatus is both the voice information and the image information.

9. An apparatus according to claim 8, further comprising:

instruction means for instructing the image information stored in said memory means to be output.

10. A communication apparatus comprising:

reception means for simultaneously receiving encoded digital image data and encoded digital voice data which were sent from a partner apparatus;

memory means for simultaneously storing the digital image data and the digital voice data which were received by said reception means;

instruction means for instructing the digital image data and the digital voice data stored in said memory means to be output;

decode means for decoding the digital image data and the digital voice data both stored in said memory means, in accordance with an instruction from said instruction means;

output means for outputting a voice signal on the basis of the decoded voice data and outputting visible image data on the basis of the decoded image data, wherein said output means simultaneously output the image data and the voice data; and judgment means for judging, based on a procedure signal sent from the partner apparatus before the data reception, whether the data sent from the partner apparatus are both the voice data and the image data or is either one of the voice and image data, wherein said reception means, said memory means and said output means execute the simultaneous processing of the voice data and the image data, when said judgment means judges that the data sent from the partner apparatus are both the voice data and the image data.

11. A communication apparatus which is connected to an ISDN, comprising:

reception means for simultaneously receiving voice information and image information which were digitally encoded from a plurality of channels of the ISDN;

memory means for simultaneously storing the digitally-encoded voice information and the digitally-encoded image information both received by said reception means;

conversion means for converting the digitally-encoded voice information which was stored by said memory means into an analog signal;

control means for simultaneously executing a recording output of the image information which was received by said reception means and a voice output based on the analog signal which was converted by said conversion means; and judgment means for judging, based on a procedure signal from a partner apparatus before the data reception, whether the information sent from the partner apparatus are both the voice information and the image information or is either one of the voice and image information, wherein said reception means, said memory means and said control means execute the simultaneous processing of the voice information and the image information, when said judgment means judges that the information sent from the partner apparatus is both the voice information and the image information.

12. A communication method comprising the steps of:

receiving simultaneously encoded digital image data and encoded digital voice data which were sent from a partner apparatus;

storing simultaneously in a memory the digital image data and the digital voice data which were received in said receiving step;

instructing the digital image data and the digital voice data stored in said storing step to be output;

decoding the digital image data and the digital voice data both stored in the memory in accordance with said instructing step;

outputting simultaneously both a voice signal on the basis of the decoded voice data and visible image data on the basis of the decoded image data; and judging, based on a procedure signal sent from the partner apparatus before the data reception, whether the data sent from the partner apparatus are both the voice data and the image data or is either one of the voice and image data, wherein said receiving step, said storing step and said outputting step are performed to process simultaneously the voice data and the image data when it is judged in said judging step that the data sent from the partner apparatus are both the voice data and the image data.

13. A communication method for a communication apparatus which is connected to an ISDN, comprising the steps of:

receiving simultaneously voice information and image information which were digitally encoded from a plurality of channels of the ISDN;

storing simultaneously the digitally-encoded voice information and the digitally-encoded image information both received in said receiving step;

converting the digitally-encoded voice information which was stored in said storing step into an analog signal;

executing simultaneously a recording output of the image information which was received in said receiving step and a voice output based on the analog signal which was converted in said converting step; and judging, based on a procedure signal from a partner apparatus before the data reception, whether the information sent from the partner apparatus are both the voice information and the image information or is either one of the voice and image information, wherein said reception step, said storing step and said executing step are performed to process simultaneously the voice information and the image information when it is judged in said judging step that the information sent from the partner apparatus is both the voice information and the image information.

* * * * *